United States Patent [19]

Tunesi

[11] 4,118,049
[45] Oct. 3, 1978

[54] DEVICE FOR THE FIXING OF A BEAM TO THE CHASSIS OF A TOURING CARAVAN

[76] Inventor: Roger Tunesi, 12 Monte Beaumur, Vienne-Isere, France

[21] Appl. No.: 723,677

[22] Filed: Sep. 16, 1976

[30] Foreign Application Priority Data

Sep. 16, 1975 [FR] France .................................. 75 28898

[51] Int. Cl.² ................................................. B60D 1/14
[52] U.S. Cl. ..................................... 280/483; 267/138
[58] Field of Search ........... 280/485, 483, 486, 406 A, 280/440; 267/138, 151; 52/515

[56] References Cited

U.S. PATENT DOCUMENTS

| | | | |
|---|---|---|---|
| 1,852,146 | 4/1932 | Carns et al. ........................... | 52/515 X |
| 2,779,605 | 1/1957 | Braunberger ........................ | 280/440 |
| 2,878,036 | 3/1959 | Simmons ............................. | 280/485 |
| 3,814,463 | 6/1974 | Tunesi .............................. | 280/406 A |

*Primary Examiner*—John A. Pekar
*Attorney, Agent, or Firm*—Remy J. VanOphem

[57] ABSTRACT

The invention concerns a new and novel device for connecting a beam or tow bar to a touring trailer or caravan. More particularly, the invention relates to a device for connecting two metallic components. The device comprises intermediate connecting components cut from a profile of light metal alloy. These components are mounted to the chassis and the towing beam and are made from a deformable, supple and insulating material so that these components provide an insulating media between different metals and, further, absorb the violent stresses transmitted to the towing beam.

12 Claims, 9 Drawing Figures

DEVICE FOR THE FIXING OF A BEAM TO THE CHASSIS OF A TOURING CARAVAN

BACKGROUND OF THE INVENTION

The present invention relates to a device for connecting two metallic components, the connection comprising a supple insulating material. It particularly concerns the fixing of a beam to a caravan chassis.

The known beams and chassis of caravans are most frequently made from steel. Their mechanical strength is correct, but they are heavy and they must undergo a surface treatment which is often costly in order to present an acceptable appearance (enamelling) and good resistance to corrosion. In theory, this problem could be solved by galvanising, but this necessitates the upkeep of a large capacity bath.

There is also a known process of constructing chassis from corrosion-free light alloy. In this case the fixing to the steel beam gives rise to an electrotytic couple. The fixing points are zones of accelerated corrosion of the beam.

In addition, modern couplings are generally fitted with load stabilisers, principally for dynamic stress (anti-snaking systems). The known solid connections transmit to the beam high peaks of stress of short duration. These peaks are comparable to shocks which necessitate high strength of the beam.

The present invention has the object of removing these disadvantages and achieving a device for the flexible connection of a beam to the chassis of a caravan. This connection abolishes the electrolytic couples caused by contact between different metals; it absorbs the most violent shocks on the beam. Finally, it allows, through standardisation, the cost price to be lower.

SUMMARY OF THE INVENTION

A fixing device according to the invention, principally for the connection between a tow bar beam and a caravan chassis is characterised in that it comprises intermediate connecting components cut from a profile of light metal alloy, these components being on the one hand fixed to the chassis of the caravan, and on the other connected to the beam which is constituted by at least one profiled spar, which components made from deformable, supple insulating material is interposed between the beam and the fixing components, so that these deformable and insulating components abolish contact between different metals and absorb the violent stresses transmitted to the beam.

According to another characteristic, the beam is constituted by two U-shaped towing beams or spars which converge at the point of coupling. Whatever may be the angle between these two spars, the fixing components are cut from the same extruded profile, the direction of the cut forming with the right angle section of this profile an angle equal to half of that between the spars.

According to another characteristic, supple insulating material is placed between the beam and the head of a fixing bolt of one beam connecting component.

According to another characteristic, a profiled component of supple insulating material is placed between the metals or alloys constituting on the one hand the beam and on the other the assembling or connecting components to the chassis so that the electrolytic couples between the alloy of the chassis and alloy of the beam are abolished.

According to another characteristic, the deformable insulating material is a type of rubber or similar material, of itself shock-absorbing, deadening the most violent dynamic stresses so as to transmit them only progressively to the beam.

According to another characteristic, the connecting pieces are cut from a profile formed by three tubes side-by-side, made in one single piece by extrusion. The external vertical wall of the first tube is drilled for the location of a bolt for a flexible connection with the beam. The upper horizontal wall of each connecting component is drilled with holes which are perpendicular with respect to the tube wall for the location of means of rigid fixing to the chassis of the caravan.

BRIEF DESCRIPTION OF THE DRAWINGS

The attached drawings, given by way of non-limiting example, will allow the characteristics of the invention to be better understood.

BRIEF DESCRIPTION OF THE PREFERRED EMBODIMENT

Figure 1:
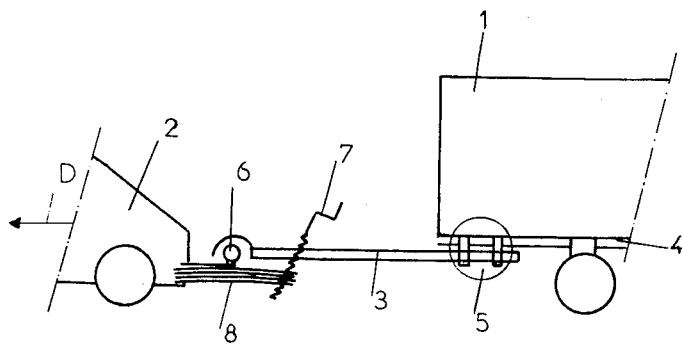
FIG. 1 is a lateral view of a towing vehicle fitted with a load distributor and coupled to a caravan by flexible connections according to the invention.

The composite vehicle shown in FIG. 1 comprises a caravan 1 coupled to a towing vehicle 2. The tow bar beam 3 is fixed at 5 to the chassis 4 and coupled at its front end, to the towing ball 6. It carries a stabiliser, for example a screw jack 7 acting on leaf springs 8. It is known that the adjustment of this stabiliser allows the stresses on the front and rear axles of the towing vehicle 2 to be balanced.

The composite vehicle is moving in the direction of the arrow D. The road surface is not always even. The beam 3 is subject to towing stresses through the ball 6, to shearing stresses through the stabiliser and to dynamic bending stresses due to the relative movements of the caravan and the towing vehicle.

In known devices, the connections 5 are rigid. The caravan and the towing vehicle transmit to the beam dynamic stresses which show very high peaks, generally of short duration (curve 9, FIG. 2). The beam must be of sufficient strength to bear the most violent stresses shown by the peaks of this curve.

Figure 2:
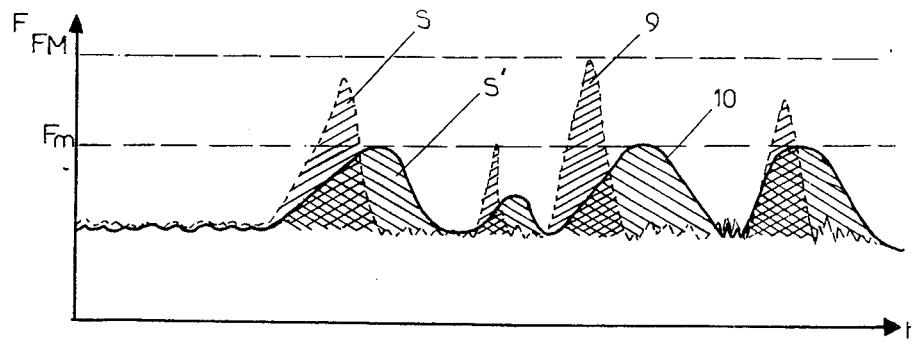
FIG. 2 is a diagram showing the comparison of the dynamic stresses and shocks on the beam in the case of rigid connections (dotted line) and connections according to the invention (solid line).

It has been seen that one of the main objects of the invention consists of reducing the size of these peaks. Since the energy transmitted to the beam does not change, flexible connections 5 are made to spread this energy over longer time. Then the curve 10 of FIG. 2 is obtained. The effect of shock is reduced without the average stress on the beam being changed. The surface area of S and S¹ have the same value (FIG. 2).

Figure 3:
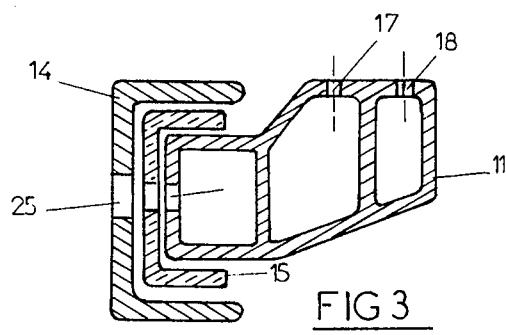
FIG. 3 is a simplified view showing a connection with flexible material interposed between the beam and the connecting component.
Figure 4:
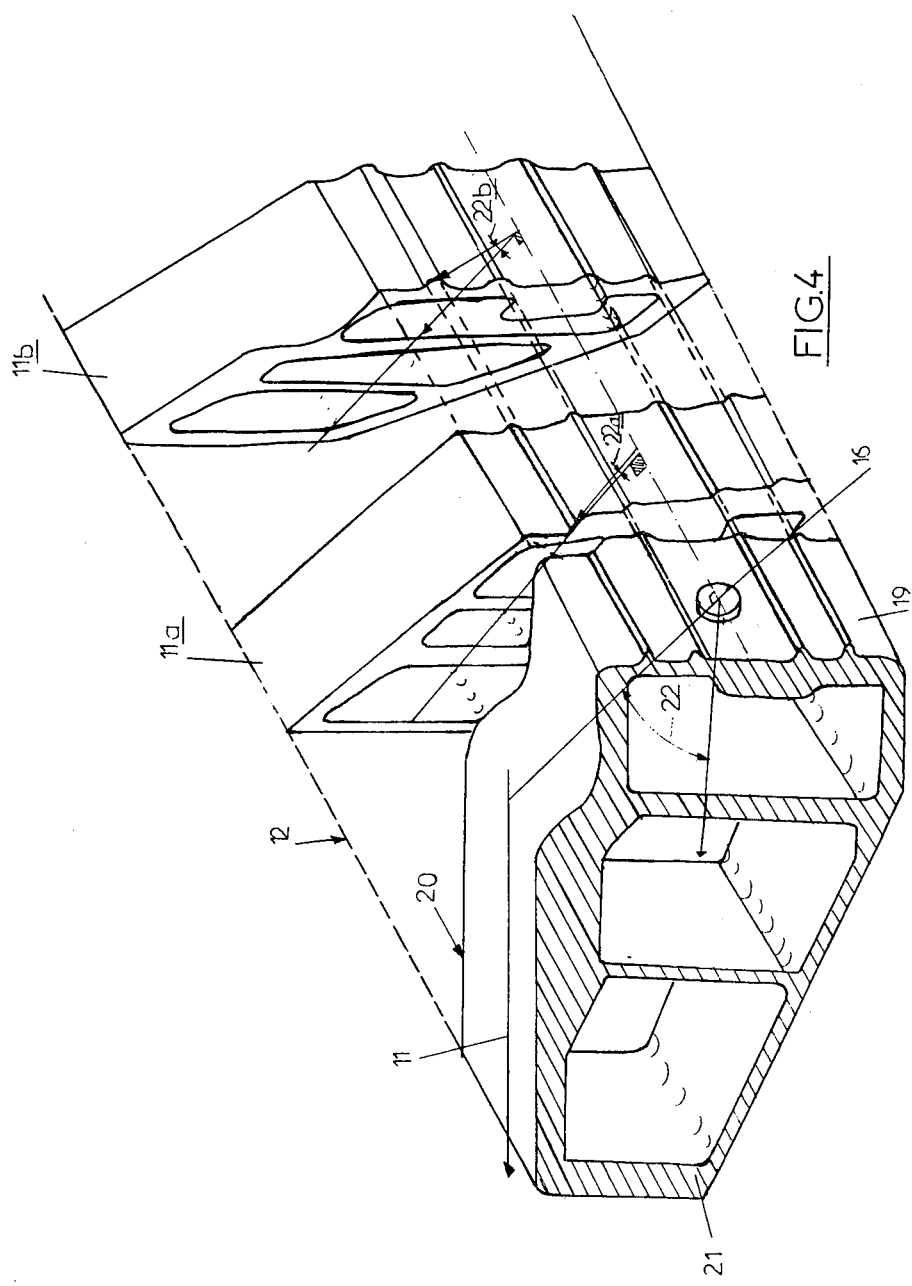
FIG. 4 is a view in perspective of some connecting components according to the invention cut at different slopes in the same profile.

As shown in FIG. 3, the fixing device which allows this result to be obtained comprises a component 11 cut from an extruded hollow wall profile 12, made from light alloy. Between this metal component and a U spar 14 of the beam there is interposed a nested profile 15 cut from flexible deformable and insulating material, usually a rubber of the neoprene type (FIG. 3). The rubber 15 prevents metallic contact between the components 11 and 14, made respectively from light alloy and steel. This electrical insulation eliminates electrolytic couples which generate zones of corrosion. The construction enabling reduction of manufacturing cost is exemplified by FIGS. 4, 5, 8, and 9.

Figure 5:
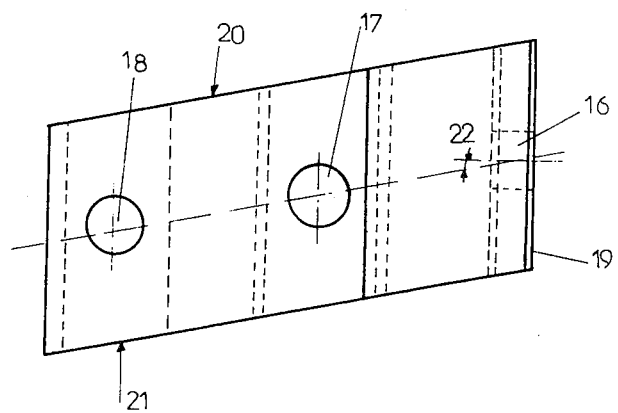
FIG. 5 is a view of a connecting component seen from above.
Figure 8:
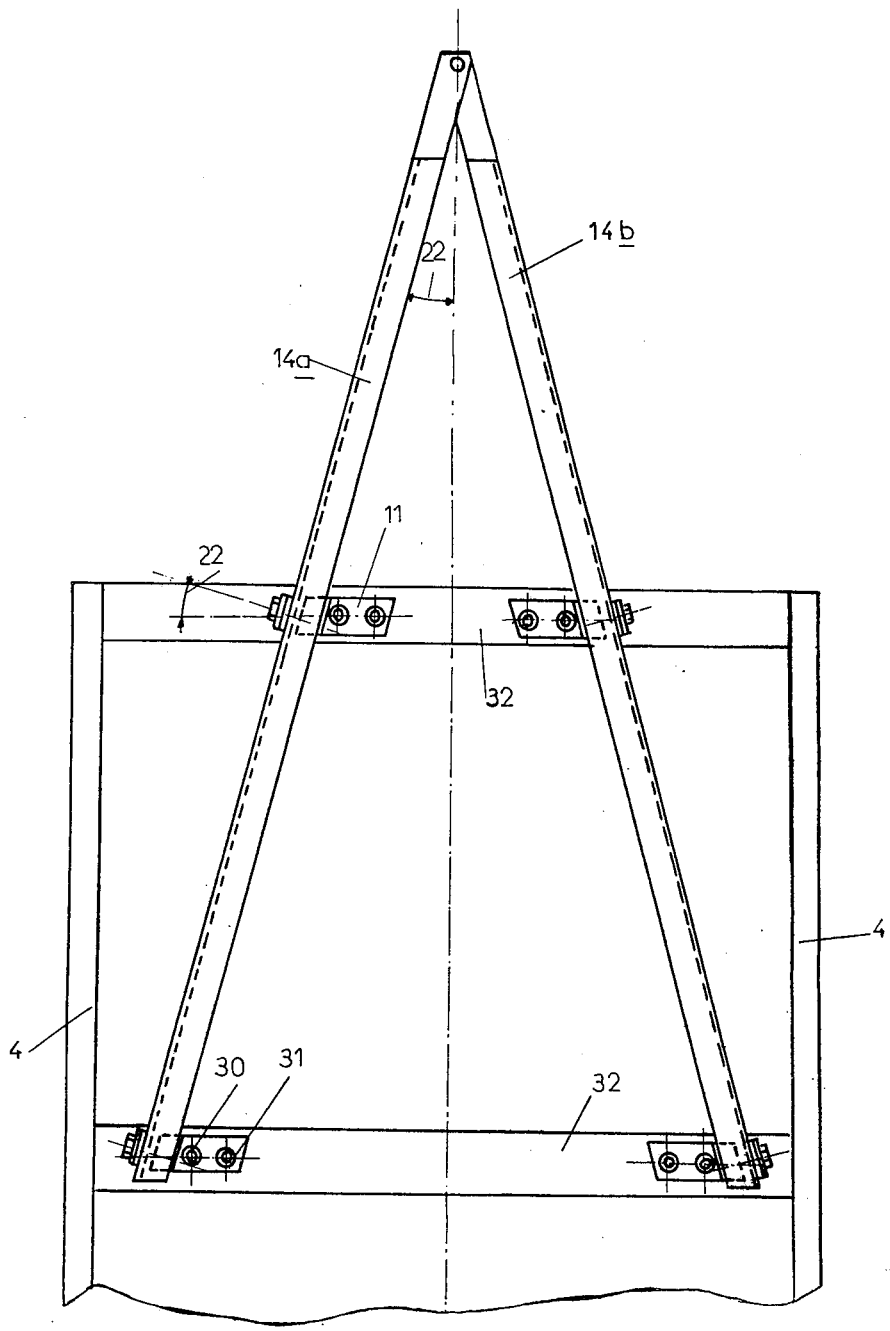
FIG. 8 is a view showing the connection of a beam and a chassis at four connecting points.
Figure 9:
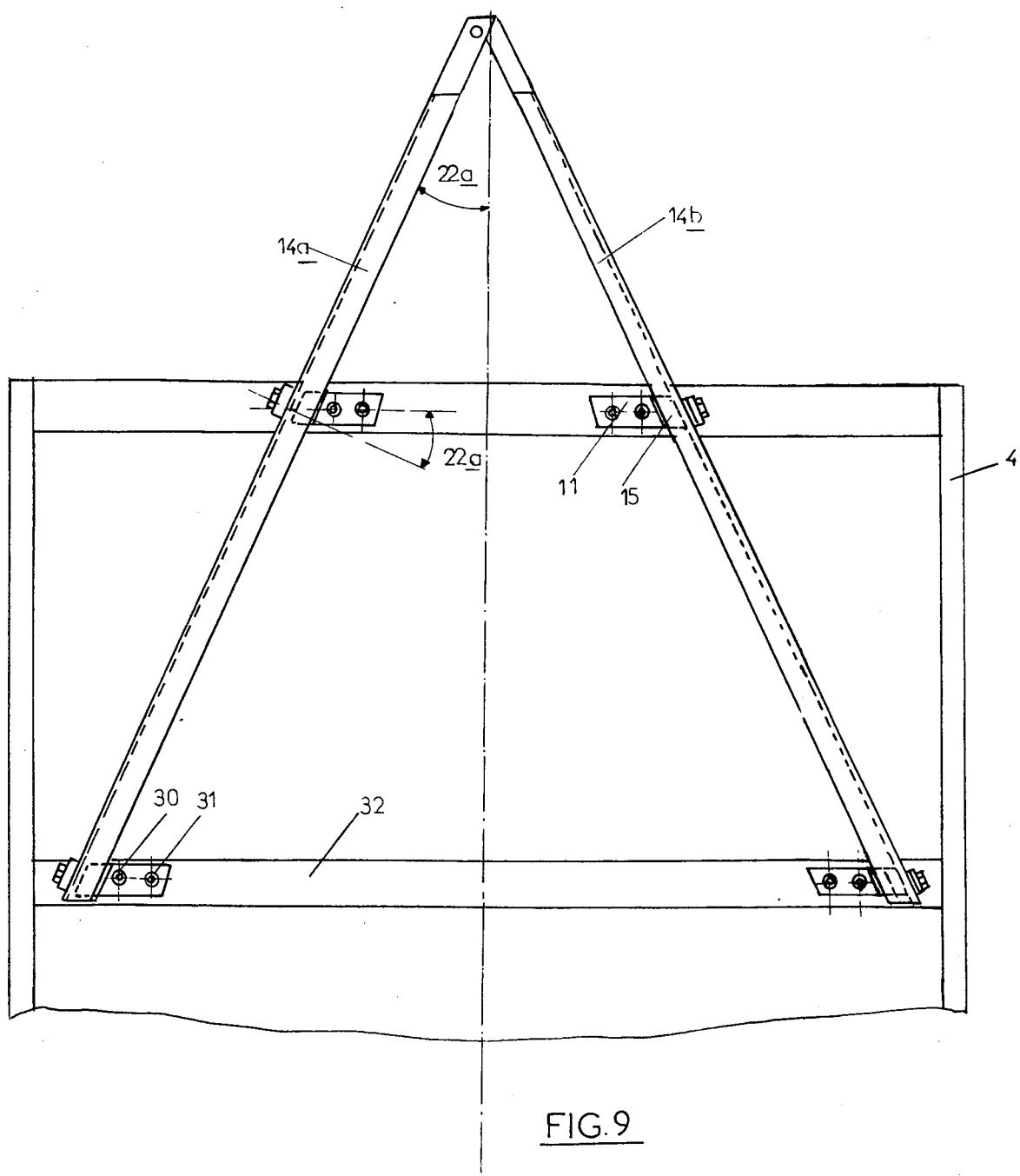
FIG. 9 is similar to FIG. 8. It shows the connection of a beam to a wider chassis.

The component 11 is drilled with a rear opening 16 and upper openings 17 and 18 for fixing on the one hand to the beam and on the other to the chassis of the caravan. The extruded profile 12 shown in FIG. 4 comprises a rear longitudinal wall 19. The connecting component shown in FIG. 5 comprises two lateral faces 20 and 21 closely parallel to each other. The cut is inclined to the rear face 19 at an angle 22 equal to half the angle between the spars 14a and 14b which form the beam 3 (FIGS. 5, 8 and 9). Thus, in the same profile 12, different connecting components 11, 11a, 11b may be cut at different slopes 22. This construction reduces the manufacturing cost of the fixing.

Figure 6:
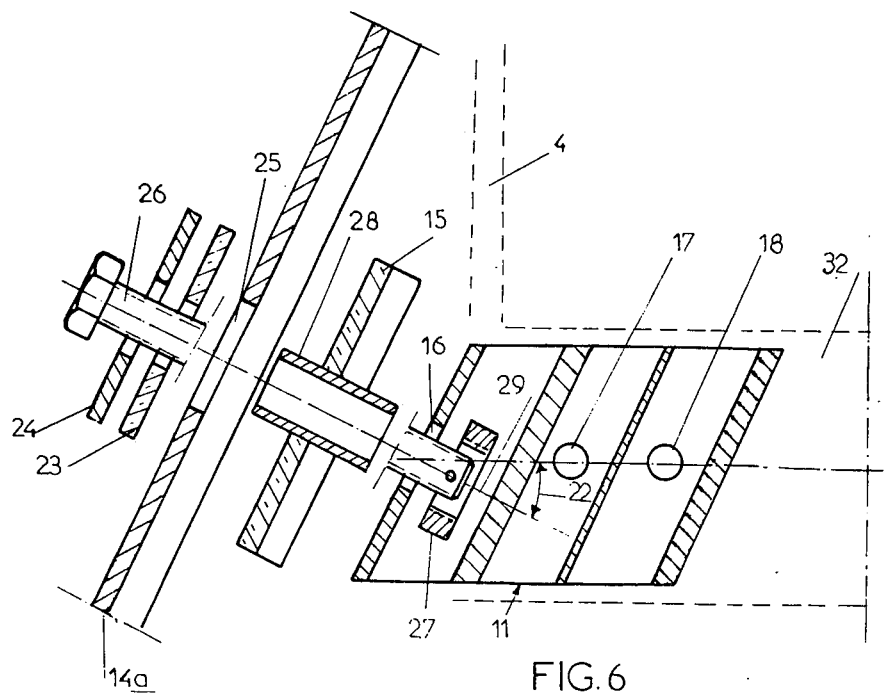
FIG. 6 is a section along VI—VI (FIG. 7) showing an exploded view of standard components for a flexible connection eliminating contact between different metals.
Figure 7:
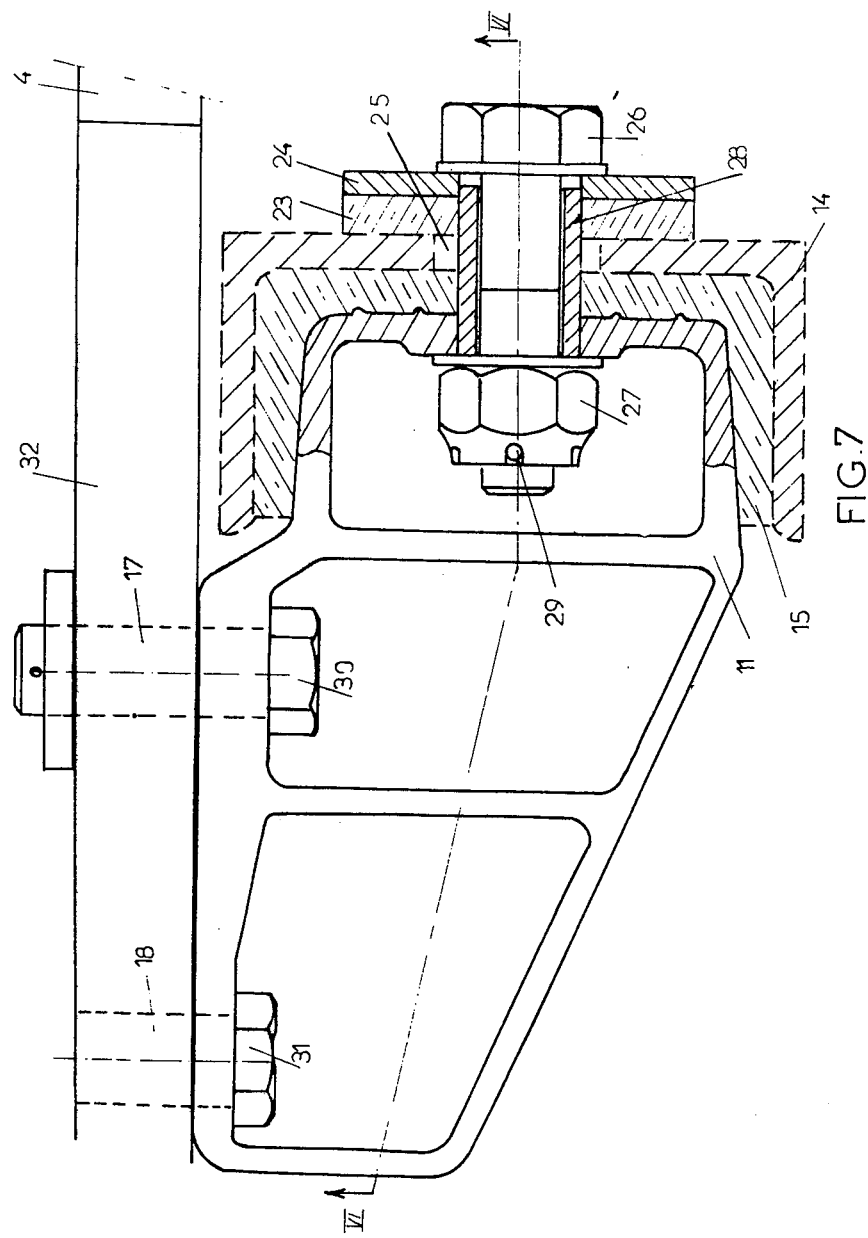
FIG. 7 is a detailed view of a flexible connection beam to chassis.

There is shown in FIGS. 6 and 7 the assembly of a flexible connection for caravan beams. The spar 14 and the connecting component 11 are separated by the deformable and insulating U shape 15. On the outside of the U there are placed a washer 23 made from deformable material and a metal washer 24 opposite an opening 25 of appreciably larger diameter than the opening 16 in the connecting component. The assembly is carried out by tightening and locking a nut 27 on to a screw 26 which is introduced into a sleeve 28. The nut of this assembly is prevented from unscrewing by a pin 29. Finally, the component 11 is fixed by bolts 30 and 31 to the cross-members 32 of the chassis 4 of the caravan.

It will be seen in FIG. 7 that the fixing of the component 11 to the beam 14 comprises means of assembly (bolts 26,27, washer 24, sleeve 28) which are in metallic contact with the connecting component 11 and the chassis 4 of the caravan.

On the other hand, the diameter of the opening 25 in the beam and the interposal of insulating, deformable components 15 and 23 on each side of this beam prevent all metallic contact between the component 11 (hence the chassis 4) and the beam 14. The washer 23 and the U shape 15 made from deformable, shock-absorbing and insulating material deaden the most violent shocks transmitted to the beam so as to spread them over longer time as indicated by the curve 10 of FIG. 2. In addition, electrolytic couples between a light alloy chassis and a steel beam are eliminated, in consequence of the absence of metallic contact between the two parts. It will be noted that the compression of the rubbers 15 and 23 is limited by the length of the sleeve 28.

Finally, the components 11 are fixed in a conventional manner to the cross-members of the caravan chassis. The angle between the spars 14a and 14b forming the beam is a function of the length of this beam and the width of the chassis 4. The angle 22 varies with the type of caravan, but whatever its value, the components 11 may be cut from the same profile. It is sufficient to vary the angle of the cut to the longitudinal plane of this profile 12 (FIGS. 8 and 9).

Naturally, the scope of the invention will not be exceeded by modifying manufacturing details of the flexible connection. Thus the shape of the profile from which the connecting components are cut is given only by way of example. Similarly, for a heavier caravan, the components may be made with greater width so as to ensure the flexible connection to the beam by two bolts 26,27 and to the chassis of the caravan by two bolts 30 and two bolts 31. Finally, at the extreme, the beam could be constituted by only one longitudinal RSJ; the angle 22 would then be nil.

The principal advantages of the invention are the following:

a detachable connection between a steel beam and a light alloy caravan chassis without corrosive electrolytic couples being created;

a flexible connection absorbing the most violent dynamic stresses on the beam, from whence comes the possibility of making a beam of light alloy;

the reduction of the cost price through the standardisation of connecting components out from the same profile whatever may be the type of caravan.

Having described the invention what is claimed is:

1. A tow bar arrangement for a caravan, said tow bar arrangement adapted to be connected to a caravan chassis, the tow bar arrangement comprising:

at least one U-shaped tow bar beam;

a hitch coupling secured to a forward end of said at least one U-shaped tow bar beam, said hitch coupling adapted to connect the forward end of said at least one U-shaped tow bar beam to a towing vehicle;

connecting means securing said at least one U-shaped tow bar beam to said caravan chassis so as to extend forwardly from said caravan chassis, said connecting means comprising:

at least one connecting component mounted to said at least one tow bar beam and to said chassis;

fastener means directly securing said at least one connecting component to said caravan chassis;

an insulating U-shaped deformable material interposed said at least one connecting component and said at least one U-shaped tow bar beam, said insulating U-shaped deformable material further being nested within said at least one U-shaped tow bar beam;

said at least one connecting component further including a surface portion fit within said insulating U-shaped deformable material; and means fixing said at least one tow bar beam to said at least one connecting component with said insulating deformable material interposed, whereby said at least one tow bar beam is insulated from said caravan chassis.

2. The tow bar arrangement according to claim 1 wherein said means fixing said at least one tow bar beam to said at least one connecting component includes a fastener extending through said at least one connecting component portion, said deformable material and said at least one tow bar beam.

3. The tow bar arrangement according to claim 2 wherein said fastener comprises a bolt assembly and wherein said means fixing said at least one tow bar beam to said at least one connecting component further includes an insulating deformable washer interposed in said bolt assembly insulating said bolt assembly from said at least one tow bar beam.

4. The tow bar arrangement according to claim 3 wherein said at least one tow bar beam further comprises a clearance opening in said at least one tow bar beam through which said bolt assembly extends, said clearance passage of sufficient diameter to insulate said bolt assembly from metallic contact with said at least one tow bar beam.

5. The tow bar arrangement according to claim 4 wherein a metallic washer is interposed between said resilient washer and said bolt assembly whereby metallic contact is obtained with said bolt assembly.

6. The tow bar arrangement according to claim 1 wherein said at least one tow bar beam is constructed of steel and wherein said at least one connecting component is constructed of a differing metal comprised of a light metal alloy, whereby said insulating deformable material prevents contact of said differing metals.

7. A tow bar arrangement for a caravan, said tow bar arrangement adapted to be connected to a caravan chassis, the tow bar arrangement comprising:
a pair of U-shaped tow bar beams;
a hitch coupling secured to a forward end of each of said pair of tow bar beams, said hitch coupling being adapted to connect said forward end of each of said pair of tow bar beams to a towing vehicle;
first connecting means securing one of said pair of tow bar beams to said caravan chassis so as to extend forwardly from said caravan chassis;
second connecting means securing the other of said pair of tow bar beams to said caravan chassis so as to extend forwardly from said caravan chassis, said first and second connecting means securing said one and said other of said pair of tow bar beams respectively so as to converge into each other at a point forward of said caravan chassis at which said hitch is located;
said first and second connecting means each comprising:
a connecting component having one end mounted to said tow bar beam and another end mounted to said chassis;
fastener means directly securing said connecting component to said caravan chassis;
an insulating deformable material interposed said connecting component and said tow bar beam, said insulating deformable material further being nested within said U-shaped tow bar beam;
first means fixing said one of said U-shaped tow bar beams to said first connecting component with said insulating deformable material interposed, whereby said one of said tow bar beams is insulated from said caravan chassis; and
second means fixing said other of said U-shaped tow bar beams to said second connecting component with said insulating deformable material interposed, whereby said other of said tow bar beam is insulated from said caravan chassis.

8. The tow bar arrangement according to claim 7 wherein each of said connecting components are formed with a surface engaging said deformable material extending at an angle corresponding to said convergency defined by the mounting of said pair of tow bar beams to said connecting components on said caravan chassis.

9. The tow bar arrangement according to claim 8 wherein said pair of tow bar beams are of U-shape in section and wherein said insulating deformable materials are also of U-shape nested within each of said pair of tow bar beams, and wherein said connecting components each includes a surface portion extending into engagement with said insulating deformable material, said surface portions extending along said angle of convergency of said pair of tow bar beams.

10. The tow bar arrangement according to claim 9 wherein said connecting components are formed of a hollow walled extrusion and wherein said respective surface portions disposed within said respective deformable materials comprise a sidewall of said hollow extrusion and wherein said connecting components are each cut along an angle to said sidewall complementary to said angle of convergency of said pair of tow bar beams, whereby said connecting components may be adapted to any convergency angle from a single hollow walled extrusion shape by variation of said angle of cut.

11. The tow bar arrangement according to claim 10 wherein said hollow walled extrusion comprises three side-by-side tubes of one piece construction, two of said tubes having openings therein through the upper walls thereof adapted to receive said fastener means directly mounting said first connecting component to said caravan chassis and a third of said tubes comprises said portion extending into engagement with said deformable material and having an opening formed therein, adapted to receive said first means fixing said first connecting component to one of said pair of tow bar beams.

12. The tow bar arrangement according to claim 10 wherein said hollow walled extrusion comprises three side-by-side tubes of one piece construction, two of said tubes having openings therein through the upper walls thereof adapted to receive said fastener means directly mounting said second connecting component to said caravan chassis and a third of said tubes comprises said portion extending into engagement with said deformable material and having an opening formed therein, adapted to receive said second means fixing said second connecting component to the other of said pair of tow bar beams.

* * * * *